United States Patent Office 3,039,979
Patented June 19, 1962

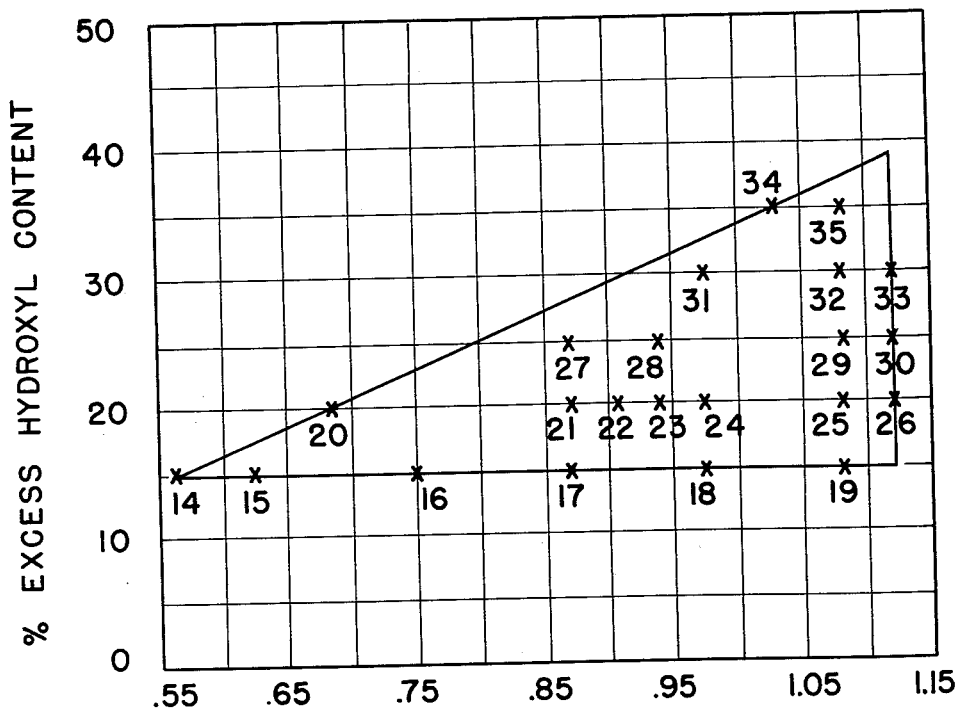

3,039,979
NEW POLYESTER RESINS AND COATING COMPOSITIONS CONTAINING SAME
Daniel J. Carlick, Berkeley Heights, N.J., and Norman J. Kennedy, Manhasset, Leon Kutik, Jackson Heights, and Howard T. Roth, Ridgewood, N.Y., assignors to Interchemical Corporation, New York, N.Y., a corporation of Ohio
Filed Nov. 25, 1959, Ser. No. 855,410
8 Claims. (Cl. 260—21)

This invention relates to new organic solvent soluble polyester resins compatible with amine-aldehyde resins and reactive therewith under heat-curing conditions to yield very durable surface coatings which exhibit an excellent resistance to detergents, soaps, solvents, water, salt spray and food staining.

For a number of years it has been known that extremely had thermosetting resins that are stain and scratch resistant can be made by reaction of an aldehyde (preferably formaldehyde) with a polyfunctional amine, such as urea, biuret, dicyandiamide, and (especially) triazines such as ammeline, melamine, substitute melamines, benzoguanamine, etc.

These resins are available commercially under trade names such as Uformite, Resimene, Aerotex, Cymel, etc. While these amine-aldehyde resins have proven to be very valuable in a number of applications, when used alone they are not satisfactory for most surface coating applications due to their poor adhesion to metal surfaces and to their poor flexibility. However, because their extraordinary hardness and good alkali and detergent resistance are much sought after properties in surface coating applications, many attempts have been made to combine these amine-aldehyde resins with other resins to produce desirable surface coatings. For instance, coatings having improved adhesion and flexibility were obtained by combining the amine aldehyde resins with oil modified alkyd resins.

While polyester and amine-aldehyde resin combinations have provided surface coatings useful in many areas in the past, these combinations have been proven to be less than desirable for many surface coating applications especially wherein good resistance to the modern synthetic detergents is required. This is particularly true in home laundry and dishwashing appliances and to a lesser extent in a wide variety of home appliances such as kitchen cabinets and refrigerators which are constantly being cleaned with various detergents and soaps.

The relatively poor detergent and alkali resistance of alkyd, or polyester ester resins and coatings comprised of such resins has long been recognized. It is though to be due to the hydrolytic action of the alkali, or detergent, on the ester linkages in the resin.

There have now been discovered new alkyd, or polyester resins, which are compatible with amine-aldehyde resins and which when combined with such amine-aldehyde resins and heat cured provide surface coatings displaying remarkable detergent, alkali, soap and solvent resistance as well as toughness, flexibility, scratch resistance and stability to discoloration, even when subjected to heating at considerably higher temperatures or for longer periods than is needed for full cure. This unique combination of properties make the coating composition of this invention very desirable particularly for the home and kitchen appliances described above.

These new polyester resins are made by the condensation of (1) carboxyl group containing materials comprising isophthalic acid, a monobasic acid selected from the group consisting of aliphatic monocarboxylic acids having chain lengths of 8–12 carbon atoms, benzoic acid and p-tertiary butyl benzoic acid and preferably but not necessarily a member of the group consisting of fumaric acid, maleic anhydride and adipic acid and (2) hydroxyl groups containing materials comprising a dihydric alcohol selected from the group consisting of neopentyl glycol and 1,3 butylene glycol and a polyhydric alcohol containing at least 3 hydroxyl groups selected from the group consisting of trimethylol ethane, trimethylol propane, 1,2,6 hexane triol and pentaerythritol.

With respect to the carboxyl group containing materials or acidic materials, isophthalic acid is a required reactant.

The monobasic acid is preferably pelargonic acid. However, acids such as 2-ethyl hexoic acid, caprylic acid, lauric acid, benzoic acid and p-tertiary butyl benzoic acid provide very suitable substitutes therefor. The monobasic acid serves a chain stopping function in the reaction. It serves to prevent or limit extensive crosslinking which would cause gelation before the esterification nears completion.

Although not required, an additional acidic reactant selected from the group consisting of fumaric acid, maleic anhydride and adipic acid is preferably used. Of the three, fumaric acid is the most desirable.

The proportions of the different acidic ingredients, while not critical, should be chosen to provide a desirable polyester resin. The following ranges have been found to be most suitable for a desirable polyester resin:

| | |
|---|---|
| Isophthalic acid | 40 to 80% of the total equivalent weight of acidic material. |
| Monobasic acid | 20 to 30% of the total equivalent weight of acidic material. |
| Member of group of fumaric acid, adipic acid and maleic anhydride | 0–30% of the total equivalent weight of acidic material. |

The dihydric alcohol is preferably neopentyl glycol; 1,3 butylene glycol is also very suitable. Trimethylol ethane is preferred for the polyhydric alcohol having at least 3 hydroxyl groups. However, trimethylol propane, 1,2,6 hexane triol and pentaerythritol provide very suitable substitutes.

The proportions of the total acidic material reacted, the dihydric alcohol and the 3 or more hydroxyl groups containing polyhydric alcohol have critical limitations with respect to each other. These critical limitations have been plotted on the graph of the figure and have been included in the claims which incorporate the critical limitations of said graph. The graph was prepared as a result of a series of experiments wherein acidic materials consisting of isophthalic acid, fumaric acid and pelargonic acid were condensed with varying proportions of neopentyl glycol and trimethylol ethane. The total equivalent weight of the acidic material used was held constant while the equivalent weight of the dihydric and polyhydric alcohols were varied. The polyester materials produced were then blended with Resimene 875, an amine-aldehyde resin, heat cured and tested for desirability. The polyester resins which produced desirable films when so blended are tabulated in Table I as Examples 14–35 and are plotted on the graph in the figure in which the abscissa represents the number of equivalents of said polyhydric alcohol reacted for each combined equivalent of acidic material and the ordinate represents the percentage of excess hydroxyl groups present, said percentage being determined by the number of combined equivalents of said dihydric alcohol and polyhydric alcohol in excess of one equivalent present. The percent of excess hydroxyl groups and the number of equivalents of polyhydric alcohol having at least 3 hydroxyl groups may be calculated as follows:

Using the data of Example 1 which follows, the gram equivalent weights for each of ingredients A through E is determined. Then a ratio of equivalents is calculated based on the total acid reacted being equal to 1 equivalent.

| | Equiv. | | Equiv. |
|---|---|---|---|
| Isophthalic acid | .50 | Neopentyl glycol | .588 |
| Fumaric acid | .25 | Trimethylol ethane | .563 |
| Pelargonic acid | .25 | | |
| Total acid | 1.00 | | 1.151 |

As 1 equivalent of alcohol reacts with 1 equivalent of acid, there is .15 equivalent of excess alcohol present and therefore 15% excess hydroxyl groups present. It is thus seen that said graph is representative of the critical relationship between the proportions of said acidic material, polyhydric alcohol and dihydric alcohol.

Considering now the graph of the figure with respect to the lower ordinate limit, it has been found that when 15% excess hydroxyl groups are present, no gelation occurs and the polyester resins when blended with amine-aldehyde resins provide cured films displaying excellent detergent resistance. Where 10% to 15% excess hydroxyl groups are present polyester-amine-aldehyde resin blends provide cured films which have decreased detergent resistance, but are still suitable for certain applications. Where the excess hydroxyl content is reduced below 10%, the average functionality of the system increases to the point where gelation occurs before the condensation reaction has proceeded very far. The upper limit of suitable ordinate values mark a limit beyond which any increase in the excess hydroxyl content for a given abscissa value would result in a polyester which when blended with amine-aldehyde resins would in turn result in a cured film displaying poor detergent resistance. The upper limit of the abscissa is marked by a line: 1.12 equivalents of polyhydric alcohol for every equivalent of acid. Any increase in the polyhydric alcohol content beyond 1.12 equivalent results in gelation before the esterification is sufficiently advanced to provide a polyester which when combined with an amine-aldehyde resin will provide a cured film having the desired detergent resistance of the cured films of this invention. The point of gelation is dependent upon the average functionality, that is the greater the average functionality, the more readily gelation occurs. Thus, an increase of the polyhydric alcohol having 3 or more hydroxyl groups beyond 1.12 equivalents increases the average functionality and consequently lowers the gel point to a point where esterification is not sufficiently complete to provide a desirable polyester.

The relationship of the final acid value to the extent of the esterification and to the gel point should now be considered. As esterification of the reactants in a mixture being condensed progresses, the acid value becomes progressively lower. Depending on the average functionality of the reactants, gelation will begin to occur at varying acid values. In the experiments which follow, it has been found that the polyester resins having the most desirable properties have final acid values between 5–42 depending on the reactants. In each example, there is indicated the final acid value to which the mixture involved must be brought down to in order to insure a desirable polyester resin. It will be understood that as the average functionality of the reactants increases, the acid value to which the reacting mixture may be lowered is limited by the earlier occurring gelation.

The preparation of the novel polyester resins preferably consists of two steps. The first step is a direct fusion reaction wherein the ingredients are heated under air cooled reflux to partially esterify the isophthalic acid which is insoluble in organic solvents. Then an organic solvent is added and esterification is continued by heating in the presence of said solvent while the water formed during the esterification is removed by azeotropic distillation. The heating is continued until esterification is substantially completed. The solvent used should be immiscible with water so that the water of the reaction may be distilled off as a binary mixture. While xylol has been primarily used as a solvent in the following illustrative examples it will be obvious that other solvents such as benzene, toluene, aromatic petroleum naphthas and ketones may also be used.

While the amine-aldehyde resin primarily blended with the polyester resin in the examples is primarily Resimene 875, a butylated melamine-formaldehyde marketed by Monsanto Chemical Co., other amine-aldehyde resins may be readily used. These include urea, biuret, dicyandiamide and (particularly) triazines such as ammeline, melamine, substituted melamines and benzoguanamine.

While the ratio of polyester resin and amine-aldehyde resin blended is not critical, it is preferred to use a 6:4 ratio by weight on a solids basis of polyester resin:amine-aldehyde resin. Ratios between 5:5 and 8:2 have given satisfactory results.

The polyester resins of this invention show good pigment wetting power which makes easy the dispersion of pigments such as carbon black, titanium oxide, phthalocyanines, etc. in vehicles containing these resins.

The following examples will illustrate the practice of this invention.

EXAMPLE 1

| | | Weight, grams | Gram Equiv. Weight | Ratio of Equiv. |
|---|---|---|---|---|
| (A) | Isophthalic Acid | 299 | 3.60 | .500 |
| (B) | Fumaric Acid | 104 | 1.79 | .250 |
| (C) | Pelargonic Acid | 288 | 1.80 | .250 |
| (D) | Neopentyl Glycol | 220 | 4.23 | .588 |
| (E) | Trimethylol Ethane | 162 | 4.05 | .563 |
| (F) | Xylol | 54 | | |

A mixture of ingredients A, B, C, D, and E is heated under a $CO_2$ atmosphere and air cooled reflux to 160° C. Then the temperature of the mixture is slowly raised to 240° C. over a period of 3 hours. The mixture is cooled to 180° C. and F is added. Water formed during the reaction is then removed by azeotropic distillation of the mixture between 230° C. and 240° C. The azeotropic distillation is continued until the solids contained in the mixture have an acid value below 10. This requires 3 to 4 hours. Additional xylol is added to adjust the solids content of the product to 60% solids content by weight. The viscosity of the resulting product is H on the Gardner-Holdt scale and its acid number is 9. The product is compatible with hydrophobic amine-aldehyde resins. It is blended with Resimene 875 (a butylated melamine-formaldehyde resin marketed by Monsanto Chemical Corp.) in the weight ratio based on solids content of 6 parts of polyester for 4 parts of triazine resin. Steel panels are coated with this blend and then baked at 177° C. for 30 minutes. The cured films are tough and flexible. They exhibit good gloss and good color retention even when rebaked at 204° C. for 1 hour. In addition, these films exhibit an unusually high resistance to detergents, solvents, soaps, salt spray and food staining. The varnish has excellent pigment dispersing properties and may readily be pigmented by admixing with standard enamel pigments.

Additional blends of the product of Example 1 and Resimene 875 are prepared as follows:

| Product solution (60% solids) parts by weight | Resimene 875, parts by weight |
|---|---|
| 8 | 2 |
| 7 | 3 |
| 6.5 | 3.5 |

The 6.5:3.5 ratio blend has equivalent properties with the standard 6:4 blend. The 8:2 and 7:3 ratios had equivalent properties except for a slight lowering of detergent resistance.

EXAMPLE 2

| | | Weight, grams | Gram Equiv. Weight | Ratio of Equiv. |
|---|---|---|---|---|
| (A) | Isophthalic Acid | 748 | 9.0 | .50 |
| (B) | Fumaric Acid | 261 | 4.5 | .25 |
| (C) | p-Tertiary Butyl Benzoic Acid | 801 | 4.5 | .25 |
| (D) | Neopentyl Glycol | 491 | 9.5 | .525 |
| (E) | Trimethylol Ethane | 450 | 11.2 | .625 |
| (F) | Xylol | 111 | | |

A mixture of ingredients A, B, C, D, and E is heated under a $CO_2$ atmosphere and air cooled reflux to 165° C.–170° C. Then the temperature of the mixture is slowly raised to 235°–240° C. over a period of 3 hours. The mixture is cooled to 180° C. and F is added. Water formed during the reaction is then removed by azeotropic distillation of the mixture between 230° and 240° C. The azeotropic distillation is continued until the solids contained in the mixture have an acid value of 9–11. Additional xylol is added to adjust the solids content of the product to 60% solids content by weight. The viscosity of the resulting product is W–X on the Gardner-Holdt scale. The product is compatible with amine-aldehyde resins. It is blended with Resimene 875 in a weight ratio (solids basis) of 6 parts polyester to 4 parts triazine resin. Steel panels are coated with this blend and then baked at 177° C. for 30 minutes. The baked film shows detergent, soap, and solvent resistance which is slightly better than that of the baked film of Example 1. The film is harder but less flexible than that of Example 1. The other properties are equivalent to those of the film in Example 1.

EXAMPLE 3

| | | Weight, pounds | Ratio of Equivalents |
|---|---|---|---|
| (A) | Isophthalic Acid | 20.50 | .50 |
| (B) | Fumaric Acid | 7.11 | .25 |
| (C) | Pelargonic Acid | 19.70 | .25 |
| (D) | 1,3 Butylene Glycol | 11.70 | .525 |
| (E) | Trimethylol Ethane | 12.30 | .625 |
| (F) | Xylol | 2.88 | |
| (G) | Xylol | 19.33 | |
| (H) | V.M. & P. Naphtha | 20.33 | |

Example 3 is repeated using the above listed ingredients. The resulting polyester solution has a 60% solids content by weight, an acid number of 9.9 and a viscosity at 25° C. of W–X on the Gardner-Holdt scale. The polyester solution is compatible with amine-aldehyde resins. It is blended with Uformite MX-61 (a butylated benzoguanamine formaldehyde resin available from Rohm & Haas Co.) in a weight ratio (solids basis) of 6 parts polyester to 4 parts triazine resin. Steel panels are coated with this blend and then baked at 177° C. for 30 minutes. The baked film has properties which are equivalent to those of Example 1.

EXAMPLE 4

| | | Weight, grams | Gram Equiv. Weight | Ratio of Equiv. |
|---|---|---|---|---|
| (A) | Isophthalic Acid | 448 | 5.40 | .75 |
| (B) | Pelargonic Acid | 288 | 1.80 | .25 |
| (C) | Neopentyl Glycol | 192 | 3.70 | .51 |
| (D) | Trimethylol Ethane | 198 | 4.95 | .69 |
| (E) | Xylol | 56 | | |

A mixture of ingredients A, B, C and D is heated under a $CO_2$ atmosphere and air cooled reflux to 167° C. Then the temperature of the mixture is slowly raised to 235°–240° C. over a period of 3 hours. The mixture is cooled to 170° C. and E is added. Water formed during the reaction is then removed by azeotropic distillation of the mixture between 229° and 235° C. The azeotropic distillation is continued until the solids contained in the mixture have an acid value below 10. This requires 3⅛ hours. Additional xylol is added to adjust the solids content of the product to 60% solids content by weight. The viscosity of the resulting product is G–H on the Gardner-Holdt scale and its acid value based on solids is 9.9. The product is compatible with amine-aldehyde resins. It is blended with Resimene 875 in a weight ratio (solids basis) of 6 parts polyester to 4 parts triazine resin. Steel panels are coated with this blend and then baked at 177° C. for 30 minutes. The baked film has properties equivalent with those of the film in Example 1 except for a slight decrease in flexibility and detergent resistance.

EXAMPLE 5

| | | Weight, grams | Gram Equiv. Weight | Ratio of Equiv. |
|---|---|---|---|---|
| (A) | Isophthalic Acid | 750 | 9.00 | .50 |
| (B) | Fumaric Acid | 260 | 4.50 | .25 |
| (C) | Pelargonic Acid | 720 | 4.50 | .25 |
| (D) | 1,3 Butylene Glycol | 270 | 6.00 | .33 |
| (E) | Trimethylol Ethane | 624 | 15.60 | .87 |
| (F) | Xylol | 105 | | |

A mixture of ingredients A, B, C, D and E is heated under a $CO_2$ atmosphere and air cooled reflux to 165°–170° C. Then the temperature of the mixture is slowly raised to 235°–240° C. over a period of 3 hours. The mixture is cooled to 170° C. and F is added. Water formed during the reaction is then removed by azeotropic distillation of the mixture between 208°–236° C. The azeotropic distillation is continued until the solids contained in the mixture have an acid value below 10. This requires 3¾ hours. Additional xylol is added to adjust the solids content of the product to 60% solids content by weight. The viscosity of the resulting product is W–X on the Gardner-Holdt scale and its acid value based on solids is 9.3. The product is compatible with amine-aldehyde resins. It is blended with Resimene 875 (a butylated melamine-formaldehyde resin available from Monsanto Chemical Co.) in a weight ratio based on solids of 6 parts polyester to 4 parts of triazine resin. Steel panels are coated with this blend and then baked at 177° C. for 30 minutes. The baked film has properties which are substantially equivalent to those of the baked film of Example 1 in all respects.

EXAMPLE 6

|     |                    | Weight, grams | Gram Equiv. Weight | Ratio of Equiv. |
|-----|--------------------|---------------|--------------------|-----------------|
| (A) | Isophthalic Acid   | 299           | 3.60               | .50             |
| (B) | Fumaric Acid       | 104           | 1.80               | .25             |
| (C) | 2-Ethyl Hexoic     | 260           | 1.80               | .25             |
| (D) | Neopentyl Glycol   | 196           | 3.78               | .525            |
| (E) | Trimethylol Ethane | 180           | 4.50               | .625            |
| (F) | Xylol              | 52            |                    |                 |

A mixture of ingredients A, B, C, D and E is heated under a $CO_2$ atmosphere and air cooled reflux to 170° C. Then the temperature of the mixture is slowly raised to 240° C. over a period of 3 hours. The mixture is cooled to 160° C. and F is added. Water formed during the reaction is then removed by azeotropic distillation of the mixture between 223° and 238° C. The azeotropic distillation is continued until the solids contained in the mixture have an acid value below 10. This requires 4½ hours. Additional xylol is added to adjust the solids content of the product to 60% solids content by weight. The viscosity of the resulting product is N on the Gardner-Holdt scale and its acid value based upon solids is 9.4. The product is compatible with amine-aldehyde resins. It is blended with Uformite MX–61 in a weight ratio based upon solids of 6 parts polyester to 4 parts triazine resin. Steel panels are coated with this blend and then baked at 177° C. for 30 minutes. The baked film has properties equivalent to those of the films of Example 1.

EXAMPLE 7

|     |                    | Weight, grams | Gram Equiv. Weight | Ratio of Equiv. |
|-----|--------------------|---------------|--------------------|-----------------|
| (A) | Isophthalic Acid   | 299           | 3.60               | .50             |
| (B) | Fumaric Acid       | 104           | 1.80               | .25             |
| (C) | Lauric Acid        | 360           | 1.80               | .25             |
| (D) | Neopentyl Glycol   | 196           | 3.78               | .525            |
| (E) | Trimethylol Ethane | 180           | 4.50               | .625            |
| (F) | Xylol              | 57            |                    |                 |

A mixture of ingredients A, B, C, D and E is heated under a $CO_2$ atmosphere and air cooled reflux to 165°–170° C. Then the temperature of the mixture is slowly raised to 235°–240° C. over a period of 3 hours. The mixture is cooled to 170° C. and F is added. Water formed during the reaction is then removed by azeotropic distillation of the mixture between 231° and 236° C. The azeotropic distillation is continued until the solids contained in the mixture have an acid value below 10. This requires 3¾ hours. Additional xylol is added to adjust the solids content of the product to 60% solids content by weight. The viscosity of the resulting product is G–H on the Gardner-Holdt scale and its acid value based upon solids is 9. The product is compatible with amine-aldehyde resins. It is blended with Uformite MX–61 in a weight ratio (solids basis) of 6 parts polyester to 4 parts triazine resin. Steel panels are coated with this blend and then baked at 177° C. for 30 minutes. The baked film has greater flexibility but is slightly softer than the films of Example 1. In all other properties the films of this example are equivalent to those of Example 1.

EXAMPLE 8

|     |                    | Weight, grams | Gram Equiv. Weight | Ratio of Equiv. |
|-----|--------------------|---------------|--------------------|-----------------|
| (A) | Isophthalic Acid   | 299           | 3.60               | .50             |
| (B) | Fumaric Acid       | 104           | 1.80               | .25             |
| (C) | Benzoic Acid       | 220           | 1.80               | .25             |
| (D) | Neopentyl Glycol   | 196           | 3.78               | .525            |
| (E) | Trimethylol Ethane | 180           | 4.50               | .625            |
| (F) | Xylol              | 50            |                    |                 |

A mixture of ingredients A, B, C, D and E is heated under a $CO_2$ atmosphere and air cooled reflux to 170° C. Then the temperature of the mixture is slowly raised to 235°–240° C. over a period of 3 hours. The mixture is cooled to 170° C. and F is added. Water formed during the reaction is then removed by azeotropic distillation of the mixture between 220° and 235° C. The azeotropic distillation is continued until the solids contained in the mixture have an acid value below 10. This requires 4¼ hours. Additional xylol is added to adjust the solids content of the product to 60% solids content by weight. The viscosity of the resulting product is W–X on the Gardner-Holdt scale and its acid value based on solids is 8.7. The product is compatible with amine-aldehyde resins. It is blended with Uformite MX–61 (a butylated benzoguanamine-formaldehyde resin marketed by Rohm & Haas Co.) in a weight ratio (based on solids content) of 6 parts polyester to 4 parts triazine resin. Steel panels are coated with this blend and then baked at 177° C. for 30 minutes. The baked film is more brittle and harder than that of Example 1. In all other properties, it is equivalent to the film of Example 1.

EXAMPLE 9

|     |                    | Weight, grams | Gram Equiv. Weight | Ratio of Equiv. |
|-----|--------------------|---------------|--------------------|-----------------|
| (A) | Isophthalic Acid   | 299           | 3.6                | .50             |
| (B) | Adipic Acid        | 131           | 1.8                | .25             |
| (C) | Pelargonic Acid    | 288           | 1.8                | .25             |
| (D) | Neopentyl Glycol   | 196           | 3.78               | .525            |
| (E) | Trimethylol Ethane | 180           | 4.50               | .625            |
| (F) | Xylol              | 55            |                    |                 |

A mixture of ingredients A, B, C, D and E is heated under a $CO_2$ atmosphere and air cooled reflux to 165° C. Then the temperature of the mixture is slowly raised to 240° C. over a period of 3 hours. The mixture is cooled to 170° C. and F is added. Water formed during the reaction is then removed by azeotropic distillation of the mixture between 227° and 234° C. The azeotropic distillation is continued until the solids contained in the mixture have an acid value below 10. This requires 4 hours. Additional xylol is added to adjust the solids content of the product to 60% solids content by weight. The viscosity of the resulting product is E–F on the Gardner-Holdt scale and its acid value based on solids is 8.6. The product is compatible with amine-aldehyde resins. It is blended with Uformite MX–61 in the weight ratio based on solids content of 6 parts polyester to 4 parts triazine resin. Steel panels are coated with this blend and then baked at 177° C. for 30 minutes. The baked film is the equivalent of the film of Example 1 in all respects with the exception of hardness. This film is softer.

EXAMPLE 10

|     |                    | Weight, grams | Gram Equiv. Weight | Ratio of Equiv. |
|-----|--------------------|---------------|--------------------|-----------------|
| (A) | Isophthalic Acid   | 100           | 1.20               | .50             |
| (B) | Maleic Anhydride   | 29.5          | .60                | .25             |
| (C) | Pelargonic Acid    | 96            | .60                | .25             |
| (D) | Neopentyl Glycol   | 103           | 1.98               | .82             |
| (E) | Trimethylol Ethane | 36            | .90                | .37             |
| (F) | Xylol              | 36            |                    |                 |

A mixture of ingredients A, B, C, D and E is heated under a $CO_2$ atmosphere and air cooled reflux to 187° C. Then the temperature of the mixture is slowly raised to 220° C. over a period of 3½ hours. The mixture is cooled and F is added. Water formed during the reaction is then removed by azeotropic distillation of the mixture between 230°–260° C. The azeotropic distillation is continued until the solids contained in the mixture have an acid value below 10. This requires 6 hours. Additional xylol is added to adjust the solids content of the product to 60% solids content by weight. The viscosity of the resulting product is C on the Gardner-Holdt scale. The product is compatible with amine-aldehyde resins. It is blended with Resimene 875 in a weight ratio of 6 parts polyester (based on solids) to 4 parts triazine resin. Steel panels are coated with this blend and then baked at 177° C. for 30 minutes. The baked film is less flexible than the film of Example 1 but is comparable to said film in all other properties including detergent resistance.

EXAMPLE 11

|   |   | Weight, grams | Gram Equiv. Weight | Ratio of Equiv. |
|---|---|---|---|---|
| (A) | Isophthalic Acid | 299 | 3.6 | .50 |
| (B) | Fumaric Acid | 104 | 1.8 | .25 |
| (C) | Pelargonic Acid | 288 | 1.8 | .25 |
| (D) | Neopentyl Glycol | 192 | 3.69 | .51 |
| (E) | Trimethylol Propane | 220 | 4.95 | .69 |
| (F) | Xylol | 52 |  |  |

A mixture of ingredients A, B, C, D and E is heated under a $CO_2$ atmosphere and air cooled reflux to 167° C. Then the temperature of the mixture is slowly raised to 235°–240° C. over a period of 3 hours. The mixture is cooled to 170° C. and F is added. Water formed during the reaction is then removed by azeotropic distillation of the mixture between 228 and 234° C. The azeotropic distillation is continued until the solids contained in the mixture have an acid value below 10. This requires 4 hours. Additional xylol is added to adjust the solids content of the product to 60% solids content by weight. The viscosity of the resulting product is E–F on the Gardner-Holdt scale and its acid value is 9.8. The product is compatible with amine-aldehyde resins. It is blended with Uformite MX–61 in a weight ratio based on solids content of 6 parts polyester to 4 parts triazine resin. Steel panels are coated with this blend and then baked at 177° C. for 30 minutes. The baked film is comparable to the film of Example 1 in all properties including detergent resistance.

EXAMPLE 12

|   |   | Weight, grams | Gram Equiv. Weight | Ratio of Equiv. |
|---|---|---|---|---|
| (A) | Isophthalic Acid | 299 | 3.60 | .50 |
| (B) | Fumaric Acid | 104 | 1.80 | .25 |
| (C) | Pelargonic Acid | 288 | 1.80 | .25 |
| (D) | Neopentyl Glycol | 196 | 3.78 | .525 |
| (E) | 1,2,6, Hexane Triol | 180 | 4.50 | .625 |
| (F) | Xylol | 55 |  |  |

A mixture of ingredients A, B, C, D and E is heated under a $CO_2$ atmosphere and air cooled reflux to 167° C. Then the temperature of the mixture is slowly raised to 240° C. over a period of 3 hours. The mixture is cooled to 170° C. and F is added. Water formed during the reaction is then removed by azeotropic distillation of the mixture between 228° C. and 234° C. The azeotropic distillation is continued until the solids contained in the mixture have an acid value below 10. This requires 3 hours. Additional xylol is added to adjust the solids content of the product to 60% solids content by weight. The viscosity of the resulting product is M–N on the Gardner-Holdt scale and its acid number based on solids is 8.3. The product is compatible with amine-aldehyde resins. It is blended with Uformite MX–61 in a weight ratio based on solids content of 6 parts polyester for 4 parts triazine resin. Steel panels are coated with this blend and then baked at 177° C. for 30 minutes. The baked film is softer than the baked film of Example 1 but is comparable thereto in all other properties including excellent detergent resistance.

EXAMPLE 13

|   |   | Weight, grams | Gram Equiv. Weight | Ratio of Equiv. |
|---|---|---|---|---|
| (A) | Isophthalic Acid | 299 | 3.6 | .50 |
| (B) | Fumaric Acid | 104 | 1.8 | .25 |
| (C) | Pelargonic Acid | 288 | 1.8 | .25 |
| (D) | Neopentyl Glycol | 192 | 3.7 | .51 |
| (E) | Pentek [1] | 178 | 4.95 | .69 |
| (F) | Xylol | 53 |  |  |

[1] A technical grade of pentaerythritol from the Heyden Chemical Corporation.

A mixture of ingredients A, B, C, D and E is heated under a $CO_2$ atmosphere and air cooled reflux to 170° C. Then the temperature of the mixture is slowly raised to 235° C. over a period of 3 hours. The mixture is cooled to 170° C. and F is added. Water formed during the reaction is then removed by azeotropic distillation of the mixture between 222° C. and 225° C. The azeotropic distillation is continued until the solids contained in the mixture have an acid value below 30. This requires 1½ hours. Additional xylol is added to adjust the solids content of the product to 60% solids content by weight. The viscosity of the resulting product is U–V on the Gardner-Holdt scale and its acid number based on solids is 27.8. The product is compatible with amine-aldehyde resins. It is blended with Resimene 875 in a weight ratio of 6 parts polyester to 4 parts triazine resin (based on solids). Steel panels are coated with this blend and then baked at 177° C. for 30 minutes. The baked film is more brittle than the baked film of Example 1, but is comparable thereto in all other properties.

EXAMPLES 14 THROUGH 35

The procedure described in Example 1 is utilized with the respective ingredients listed in Table I. The products in each example were compatible with amine-aldehyde resins and when blended with these resins in accordance with the procedure described in Example 1 the baked films produced displayed properties including excellent detergent resistance which were equivalent to the properties of the films of Examples 1. In each of Examples 14–35, the azeotropic distillation was continued until the solids contained in the mixture had the final acid value indicated for each example in Table I.

Since, as has been heretofore stated, the superior detergent resistance of the baked film is dependent on the critical ratio between the number of equivalents of polyhydric alcohol having at least 3 hydroxyl groups reacted for each equivalent of acid reacted and the percent of excess hydroxyl groups present over those necessary to react with 1 equivalent of acid, the equivalents of said polyhydric alcohol and the percent excess hydroxyl groups present are listed in Table I for each example. The information listed in Table I with respect to the percent excess hydroxyl groups and equivalents of said polyhydric alcohol has been plotted on the graph of FIGURE 1.

In performing Examples 14 through 35 according to the procedure of Example 1, 50 to 55 grams of xylol solvent are added on the first addition, and on the subsequent addition, sufficient xylol is added to adjust the solids content of the product to 60%.

Table I

| Example | Weight in Grams | | | | | Final Acid Value | Equivalents of Trimethylol Ethane for each equiv. of acid | Percent Excess Hydroxyl |
|---|---|---|---|---|---|---|---|---|
| | Isophthalic acid | Fumaric acid | Pelargonic acid | Neopentyl Glycol | Tri-Methylol Ethane | | | |
| 14 | 299 | 104 | 288 | 220 | 162 | 8.5 | .563 | 15 |
| 15 | 299 | 104 | 288 | 196.5 | 180 | 7.5 | .625 | 15 |
| 16 | 300 | 105 | 288 | 150 | 216 | 10.5 | .750 | 15 |
| 17 | 299 | 104 | 288 | 106 | 250 | 23.0 | .867 | 15 |
| 18 | 299 | 104 | 288 | 65.5 | 281 | 27.0 | .975 | 15 |
| 19 | 299 | 104 | 288 | 25 | 312 | 41.0 | 1.080 | 15 |
| 20 | 300 | 105 | 288 | 192 | 198 | 8.5 | .688 | 20 |
| 21 | 300 | 104 | 288 | 125 | 250 | 11.0 | .867 | 20 |
| 22 | 299 | 104 | 288 | 111 | 260 | 8.0 | .905 | 20 |
| 23 | 299 | 104 | 288 | 97 | 271 | 11.0 | .941 | 20 |
| 24 | 300 | 104 | 288 | 84 | 281 | 16.0 | .975 | 20 |
| 25 | 299 | 104 | 288 | 44 | 312 | 31.5 | 1.080 | 20 |
| 26 | 299 | 104 | 288 | 28 | 324 | 30.0 | 1.120 | 20 |
| 27 | 299 | 104 | 288 | 143.5 | 250 | 17.0 | .867 | 25 |
| 28 | 299 | 104 | 288 | 117 | 270 | 8.5 | .937 | 25 |
| 29 | 299 | 104 | 288 | 62.5 | 312 | 20.0 | 1.080 | 25 |
| 30 | 299 | 104 | 288 | 47 | 324 | 17.0 | 1.120 | 25 |
| 31 | 299 | 104 | 288 | 122 | 281 | 14.0 | .975 | 30 |
| 32 | 299 | 104 | 288 | 81 | 312 | 12.5 | 1.080 | 30 |
| 33 | 299 | 104 | 288 | 65.5 | 324 | 12.3 | 1.120 | 30 |
| 34 | 299 | 104 | 288 | 120 | 296 | 8.0 | 1.030 | 35 |
| 35 | 299 | 104 | 288 | 100 | 312 | 9.5 | 1.080 | 35 |

What is claimed is:

1. An organic solvent soluble polyester comprising the condensation product of (1) isophthalic acid, (2) a monobasic acid selected from the group consisting of monocarboxylic aliphatic acids having a chain length of 8–12 carbon atoms, benzoic acid and p-tertiary butyl benzoic acid, (3) a dihydric alcohol selected from the group consisting of neopentyl glycol and 1,3 butylene glycol and (4) a polyhydric alcohol containing at least 3 hydroxyl groups selected from the group consisting of trimethylol ethane, trimethylol propane, 1,2,6 hexane triol and pentaerythritol, said polyester having a maximum acid value of 42 and the proportions of said dihydric alcohol and said polyhydric alcohol reacted with each combined equivalent of all acids being limited to proportions providing reaction mixtures which when plotted on the graph shown in FIGURE 1 fall within the area defined by the triangle on said graph, the abscissa of said graph being the number of equivalents of said polyhydric alcohol present for each combined equivalent of said acids and the ordinate of said graph being the percentage of excess hydroxyl groups present, said percentage being determined by the number of combined equivalents of said polyhydric and dihydric alcohols present in excess of one equivalent.

2. A polyester according to claim 1 comprising the condensation product of the ingredients claimed in claim 1 and further including an acid selected from the group consisting of fumaric acid and adipic acid.

3. A polyester according to claim 2, being the condensation product of isophthalic acid, fumaric acid, pelargonic acid, neopentyl glycol and trimethylol ethane.

4. A polyester according to claim 1, being the condensation product of isophthalic acid, pelargonic acid, neopentyl glycol and trimethylol ethane.

5. A heat-curable surface coating composition comprising a volatile organic solvent solution of a polyester as defined in claim 1 and an organic solvent soluble amine-aldehyde resin of the class consisting of triazine-formaldehyde resins and urea-formaldehyde resins.

6. A heat-curable surface coating composition comprising a volatile organic solvent solution of a polyester as defined in claim 2 and an organic solvent soluble amine-aldehyde resin of the class consisting of triazine-formaldehyde resins and urea formaldehyde resins.

7. A heat-curable surface coating composition comprising a volatile organic solvent solution of a polyester as defined in claim 3 and an organic solvent soluble amine-aldehyde resin of the class consisting of triazine-formaldehyde resins and urea-formaldehyde resins.

8. A heat-curable surface coating composition comprising a volatile organic solvent solution of a polyester as defined in claim 4 and an organic solvent soluble amine-aldehyde resin of the class consisting of triazine-formaldehyde resins and urea formaldehyde resins.

References Cited in the file of this patent

UNITED STATES PATENTS 2,729,609    Tess et al.    Jan. 3, 1956
2,915,487    Shelley    Dec. 1, 1959

UNITED STATES PATENT OFFICE
CERTIFICATE OF CORRECTION

Patent No. 3,039,979                                June 19, 1962

Daniel J. Carlick et al.

It is hereby certified that error appears in the above numbered patent requiring correction and that the said Letters Patent should read as corrected below.

Column 1, line 20, for "had" read -- hard --; column 11, line 43, for "FIGURE 1" read -- the figure --.

Signed and sealed this 2nd day of October 1962.

(SEAL)
Attest:

ERNEST W. SWIDER                              DAVID L. LADD
Attesting Officer                               Commissioner of Patents